Patented Aug. 3, 1937

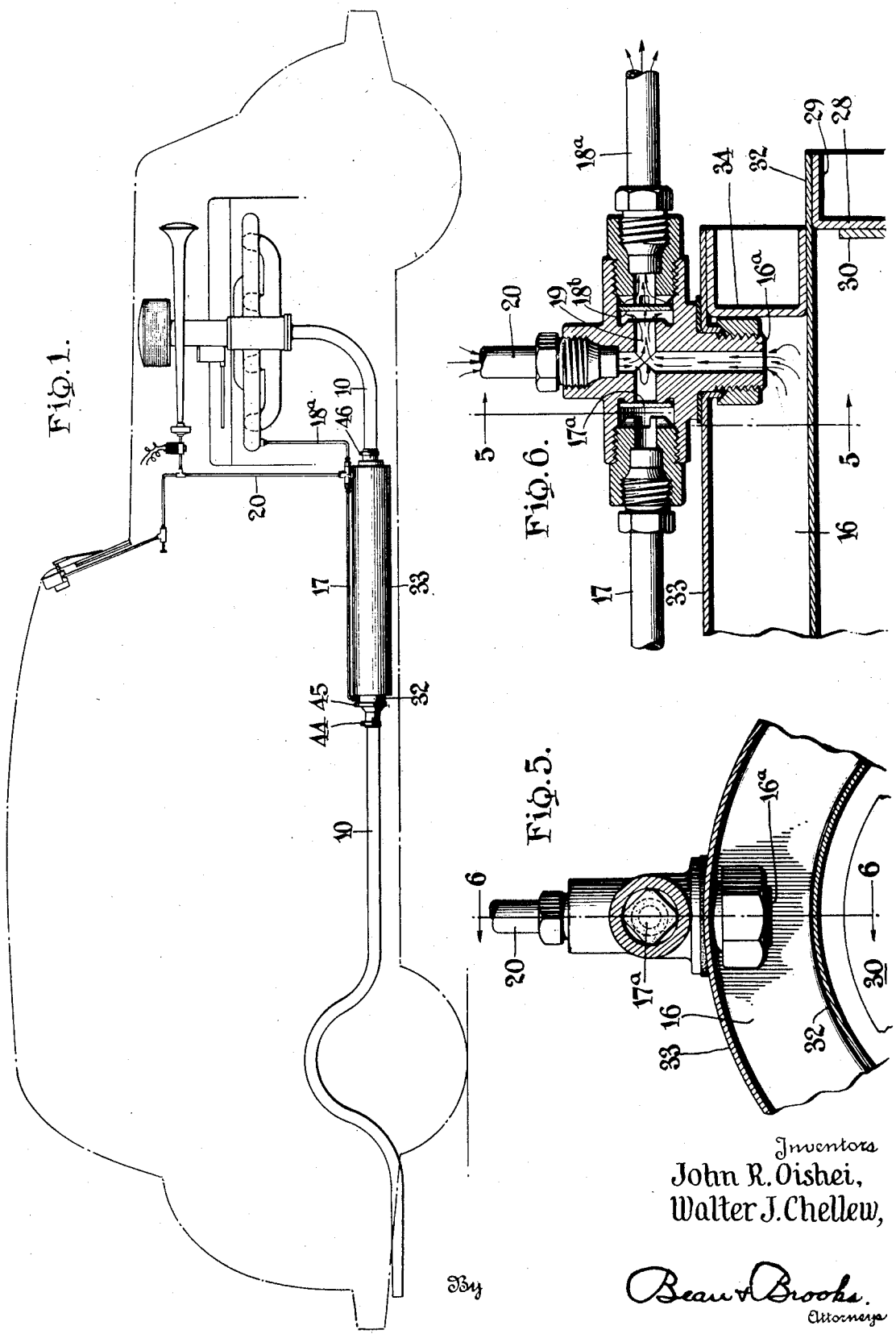

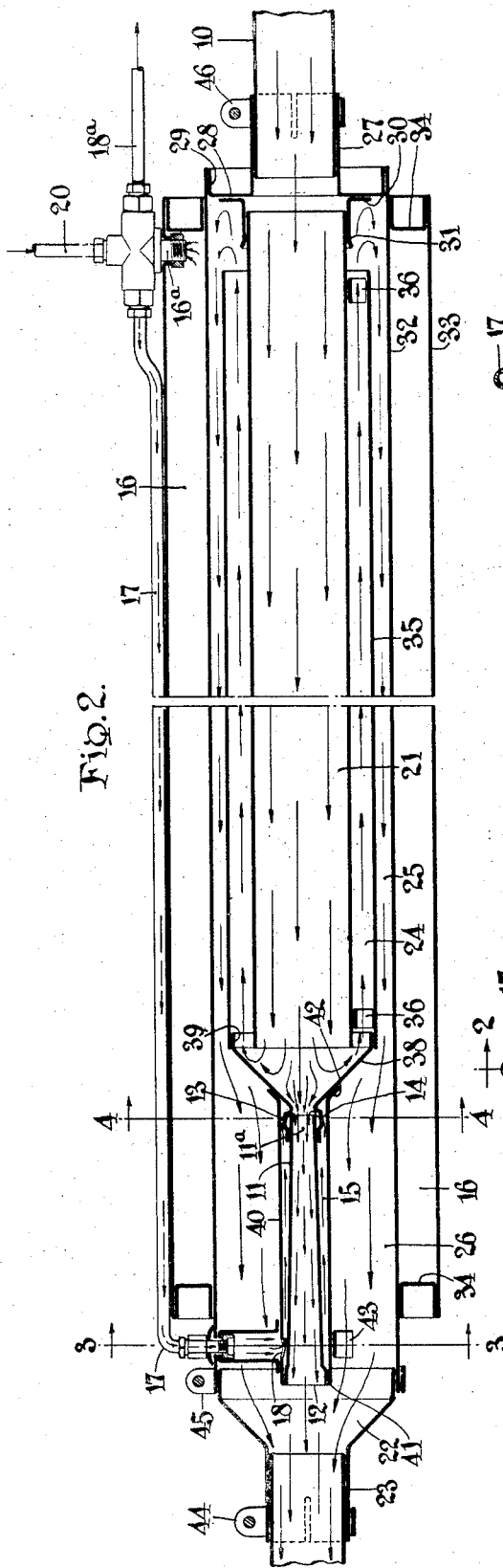

2,088,919

UNITED STATES PATENT OFFICE 2,088,919

MUFFLER CONSTRUCTION

John R. Oishei and Walter J. Chellew, Buffalo, N. Y., assignors to Trico Products Corporation, Buffalo, N. Y.

Application May 4, 1933, Serial No. 669,404

7 Claims. (Cl. 181—36)

This invention relates to mufflers for the gas exhaust systems of internal combustion engines and has for its objects the provision of a device which is of more simple form and economical construction than the present commercial devices, and further, to provide a muffler which will more efficiently transmit and muffle the exhaust gases from an engine. A further object is to provide a vacuum envelope for the muffler proper whereby any exhaust gases tending to escape from the muffler during their passage therethrough will be withdrawn and not permitted to travel into the body of the vehicle, as through the floor boards, and create therein an atmosphere charged with carbon monoxide detrimental to the health and safety of the occupants of the vehicle.

We have illustrated one form of our invention in the accompanying drawings, wherein:

Fig. 1 is a diagrammatic view of a showing of one manner of installing the muffler of the present invention in a motor vehicle.

Fig. 2 is a longitudinal sectional view taken along the line 2—2 of Fig. 3.

Fig. 3 is a transverse sectional view taken along the line 3—3 of Fig. 2.

Fig. 4 is a transverse sectional view taken along the line 4—4 of Fig. 2.

Fig. 5 is an enlarged fragmentary sectional view taken along the line 5—5 of Fig. 6.

Fig. 6 is an enlarged detailed sectional view taken along the line 6—6 of Fig. 5.

In the form of the invention illustrated, 10 illustrates a gas exhaust pipe leading from the exhaust manifold of the internal combustion engine and the arrows indicate the direction of flow of the gases being exhausted. 11 indicates a restriction in the form of an injector or Venturi tube disposed in the path of the exhausting gases which, as indicated, flares outwardly and onwardly from the point of restriction designated as 11a to the outer end 12 thereof. 13 and 14 designate openings at the point of restriction and 15 designates a chamber or passage communicating with said openings. 16 designates a vacuum or low pressure chamber surrounding the muffler. 17 designates a pipe or passage which is in communication through the port 18 with the space 15, and 18a designates a pipe or passage communicating with the intake manifold of the internal combustion engine and also with the pipe 17, as indicated at 19, and if desired with a suction operated windshield wiper or horn to be operated as indicated at 20. A pipe or passage 16a also provides communication from the vacuum chamber 16 to both the pipes 17 and 18a. Valves 17a and 18b are mounted in the pipes 17 and 18a, respectively, to control flow of fluid therethrough, but the chamber 16 is always in communication with the connection 20 to the accessory regardless of the positions of the valves 17a and 18b.

In the operation of the device, as the exhaust gases from the engine pass through pipe 10 into the inner chamber 21, they then pass into the restriction or venturi 11. Due to the restriction, the velocity of the gas must be increased in order for the smaller area to carry the same volume as the larger, but in order to accelerate the gas to the higher velocity work has to be done on it and the energy for this is furnished by loss of static pressure. There is a transformation of energy from potential or pressure form to kinetic energy. So far, this does not involve any sub-atmospheric pressures. But in the tapered or gradually flaring expansion chamber the velocity is gradually retarded and the kinetic energy possessed by the gas at its high velocity is converted back into potential energy before it is discharged at atmospheric pressure.

Therefore, if static pressure is less when gas is at high velocity and rises to atmosphere as gas velocity is retarded, then the static pressure at the high velocity point must be sub-atmospheric.

This results in a depression or partial vacuum being formed at that point and of a tendency to draw air in through the openings 13 and 14. These openings provide a suction take-off for connection to suction-operated accessories, the air flow from the accessory and the connected openings 13 and 14 being induced by reason of the low pressure at the restricted or throat portion 11a. As the openings 13 and 14 are in communication with the space 15 and through the passages 17 and 16a with the vacuum tank 16, and the windshield cleaners or horns to be operated if they are attached, the result at the point of restriction is the introduction of atmospheric air into the gases being exhausted and the evacuating or partial evacuating of the vacuum chamber 16. As the exhaust gases leave the discharge end 12 of the Venturi tube they pass into an enlarged space 22 and thereupon into a discharge pipe 23 from which they are discharged to the atmosphere in the rear of the vehicle. It has been found that the provision of the venturi with the increasing of the velocity of the exhaust gases and the lowering of the pressure thereof, the subsequent enlargement of the passage whereby the velocity of the gases is decreased and the pressure increased, effectively modifies the pulsations of the discharging gases whereby a very effective muffling action is attained. When there is air at atmospheric or subatmospheric pressures available either in the vacuum tank 16 or coming in through the operation of a windshield wiper or horn, the introduction of the air through the openings 13—14 into the stream of gases also seems to modify the pulsations of the discharging exhaust gases.

It has been found that with a gas exhaust pipe 10 having an inside diameter of 1¾", a very efficient result is obtained if the restriction 11a through which the gases pass, has an inside diameter of ½". This size restriction under low exhaust conditions of the engine system seems to accommodate and pass the major portion of the exhaust gases. Provision is made for taking care of any excess exhaust gases at higher engine speeds when the exhaust becomes greater, by providing by-pass passages. 24 designates one reach of the by-pass passages, the arrows indicating the direction of flow of the gases, and 25 designates the other reach. These excess exhaust gases as they travel rearwardly through the passage 24 and then again forwardly through the passage 25, pass out into the enlarged space or passage 26 and thence into the space 22 where they mingle with the gases discharged through the end 12 of the restricted tube and thence outwardly through pipe 23.

In the desirable form of the invention illustrated herein the exhaust pipe 10 is inserted into a collar 27. This collar has laterally and longitudinally turned flanges as at 28 and 29. The flange 28 is welded to the flange 30 of an angle piece, the longitudinal portion 31 of which is welded to the pipe 21. The longitudinally extending portion 29 of the collar is welded to the muffler jacket or casing 32 and the outer shell 33 of the vacuum tank is welded to the shell 32 by means of the angle pieces 34. The cylinder 35 defining the by-pass passages is held in place around the pipe 21 by means of the spacers 36 and is welded or secured as at 39 to the Venturi tube 11. 40 designates a partition member formed with or secured to the Venturi tube as at 41 and welded or otherwise secured to the neck member 38 as at 42 providing the vacuum space around the Venturi member; and 43 designates strut members securing and spacing the member 40 from the muffler shell 32. 44, 45 and 46 indicate brackets for securing the exhaust pipes and the muffler assembly to the vehicle.

It will thus be seen that there is provided a structure in which at least under relatively low volume of exhaust discharge the major portion of the exhaust gases is subjected to an influence, increasing its velocity and decreasing its pressure in its normal path of longitudinal movement through the muffler and that excess gases of a greater discharge volume are caused to pass forwardly longitudinally of the muffler counter to the normal flow of the gases, and then rearwardly again in the direction of the normal flow; that the gases whose velocity and pressure has been changed are then inversely influenced to decrease the velocity and partially increase the pressure.

We claim:

1. In a muffler for internal combustion engines, a gas exhaust passage shaped and adapted to discharge exhaust gases from the cylinders of the engine, said passage having a substantially restricted portion therein adapted to increase the velocity of the gases discharged and lower the pressure thereof, and a suction storage chamber enveloping the sides of said muffler, said gas exhaust passage also having a tapered outlet from the restricted portion, adapted to produce a gradual retard to the velocity of the gases as they are discharged from the restricted portion toward the atmosphere and thereby utilize the velocity energy of the gases at their high velocity to raise the static pressure of these gases to the pressure needed for discharge to the atmosphere and thereby cause a lowering of the static pressure at the said restricted portion to a point below that of atmosphere, said restricted portion also having an opening therein communicating with said enveloping chamber whereby during operation of said muffler said chamber will be partially evacuated of air and thereby guard against the leakage of gases through the outer shell of said muffler.

2. In a muffler for internal combustion engines, a gas exhaust passage shaped and adapted to discharge exhaust gases from the cylinders of the engine, said passage having a substantially restricted portion therein adapted to increase the velocity of the gases discharged and lower the pressure thereof, means for by-passing a volume of the exhaust gases around said restricted portion, dependent upon the pressure of said discharging gases adjacent the inlet end of said restricted portion, and a sub-atmospheric pressure storage chamber enveloping the sides of said muffler and having a suction take-off, said gas exhaust passage also having a tapered outlet from the restricted portion, adapted to produce a gradual retard to the velocity of the gases as they are discharged from the restricted portion toward the atmosphere and thereby utilize the velocity energy of the gases at their high velocity to raise the static pressure of these gases to the pressure needed for discharge to the atmosphere, and thereby causing a lowering of the static pressure at the said restriction to a point below that of atmospheric and said restricted portion having an opening therein communicating with said enveloping chamber whereby during operation of said muffler said chamber will be partially evacuated of air and seal the sides of said muffler against the leakage of gases therethrough.

3. A muffler for internal combustion engines, comprising a gas exhaust passage having means for muffling the noises from the exhaust gases, said muffling means including air flow inducing means, a low pressure storage chamber enveloping the exhaust passage about said muffling means for cooperating therewith in deadening the exhaust noises and serving as an insulation for the muffler, and a valved opening leading from said air flow inducing means to the chamber by which the air therein may be reduced to a sub-atmospheric pressure.

4. A muffler having a muffling chamber a suction producing venturi in the muffling chamber and located in the path of the entering gases, means in said chamber providing escape of all gases in excess of those which can readily be accommodated by the venturi, said venturi and said means coacting to muffle the exhaust noises, and a suction take-off communicating with the venturi adjacent the throat thereof.

5. A muffler unit for the discharging exhaust gas from an internal combustion engine, comprising a casing having a muffling chamber with an inlet and an outlet, means modifying the flow of exhaust gas through said casing to muffle exhaust noises, a gas pressure changing means disposed in the chamber in the path of the incoming gas stream and including a muffling portion cooperating with the first-mentioned means for further muffling exhaust noises, said first mentioned means providing a by-pass about said gas pressure changing means for excess gases, and suction take-off means connected to said pressure changing means and adapted for connection to a pressure responsive device.

6. In a muffler structure for discharging exhaust gas from an internal combustion engine, an exhaust conduit, an injector having an entrance larger than the conduit for receiving a gas stream therefrom, walls surrounding the conduit adjacent the injector to provide passages extending reversely from the direction of gas flow through the conduit and then outwardly to form a muffling gas layer around the conduit and injector, said injector including an enveloping chamber communicating with the suction portion thereof to provide a sub-atmospheric muffling space, a fluid tight chambered housing surrounding the conduit and injector and having communication with said injector chamber for exhausting air from the chambered housing, said muffler structure having an enlarged outer chamber terminating in a reduced discharge opening to prevent atmospheric air from entering therein.

7. A suction producing muffler unit for the discharging exhaust gas from an internal combustion engine, comprising a casing for a muffling chamber with an inlet and an outlet, an injector disposed in the chamber to receive the stream of exhaust gas entering the same, said injector having a restricted portion and a flaring expansion chamber, escape means disposed at the upside stream of the injector compelling a reverse flow of excess gas from the injector, muffling passages leading from said escape means and acting in cooperation with said injector to muffle the exhaust noises in said chamber, and a suction take-off adapted for connection to a suction operated device and having communication with the restricted portion of said injector whereby said muffling injector will constitute a source of suction for use in the operation of suction operated devices.

JOHN R. OISHEI.
WALTER J. CHELLEW.